United States Patent
Pelfrey et al.

[11] Patent Number: 6,053,636
[45] Date of Patent: Apr. 25, 2000

[54] HYDROSTATIC BEARING WITH COMPENSATORY FLUID INJECTION

[75] Inventors: Philip C. Pelfrey, Wellington, Fla.; John A. Kocur, Doylestown, Pa.

[73] Assignee: United Technologies Corporation, Hartford, Conn.

[21] Appl. No.: 09/189,335

[22] Filed: Nov. 10, 1998

[51] Int. Cl.[7] .................................................. F16C 32/06
[52] U.S. Cl. .......................................... 384/114; 384/100
[58] Field of Search ................................... 384/100, 114, 384/118, 120

[56] References Cited

U.S. PATENT DOCUMENTS

| | | | |
|---|---|---|---|
| 2,502,173 | 3/1950 | Potts | 384/114 |
| 3,223,463 | 12/1965 | Porath | 384/120 |
| 3,224,296 | 12/1965 | Civelli | 74/573 |
| 3,726,573 | 4/1973 | Unno | 384/111 |
| 4,772,137 | 9/1988 | Salter, Jr. et al. | 384/118 X |
| 4,902,144 | 2/1990 | Thoren | 384/398 |
| 5,017,023 | 5/1991 | Scharrer et al. | 384/114 |
| 5,169,242 | 12/1992 | Blasé et al. | 384/99 |
| 5,281,032 | 1/1994 | Slocum | 384/118 |
| 5,288,153 | 2/1994 | Gardner | 384/311 |
| 5,360,273 | 11/1994 | Buckmann | 384/99 |
| 5,415,477 | 5/1995 | Takahashi | 384/114 X |
| 5,433,528 | 7/1995 | San Andres | 384/100 |
| 5,702,186 | 12/1997 | Hackstie et al. | 384/117 |
| 5,769,545 | 6/1998 | Bentley et al. | 384/118 |

FOREIGN PATENT DOCUMENTS

| | | |
|---|---|---|
| 1149425 | 4/1969 | United Kingdom . |
| 1178763 | 1/1970 | United Kingdom . |

OTHER PUBLICATIONS

University of Southampton, Department of Mechanical Engineering, Gas Bearing Symposium, "Bearings with a Tangential Gas Supply", by Ales Tondl, Apr. 1967.

Primary Examiner—Thomas R. Hannon
Attorney, Agent, or Firm—Kenneth C. Baran

[57] ABSTRACT

A hydrostatic bearing is uniquely configured for improved operability. A hydrostatic bearing (32) has a collar (42) that circumscribes a shaft (18) to define a fluid film annulus (50) for radially confining a load supportive fluid film. An array of pockets (52) distributed circumferentially along a bearing surface (48) communicate with vent regions (64a, 64b) in which the vent pressures are substantially unequal. Supply passages (76) associated with the pockets (52) are oriented at an angle θ for injecting fluid into the annulus with an axial directional component directed toward the higher pressure vent region. The orientation angle θ compensates for the propensity of the fluid to preferentially feed the low pressure side of the bearing. Further, a hydrostatic bearing (132) has a collar (142) that circumscribes a shaft (118) to define a fluid film annulus (150) for radially confining a load supportive fluid film. An array of pockets (152) distributed circumferentially along a bearing surface (148) communicate with vent regions (164, 164b) in which the vent pressures are not necessarily substantially unequal. Dual supply passages (176) associated with each pocket are oriented at an angle θ for injecting fluid into the annulus with a tangential directional component opposite to the direction of shaft rotation, and are axially offset on opposite sides of pocket array centerline (157) by offset distances $\delta_1$, $\delta_2$. The axial offset of the passages relative to the centerline minimizes the residence time of the fluid in the film annulus (150) and therefore expands the dynamically stable speed range of the rotor system.

27 Claims, 3 Drawing Sheets

6,053,636

HYDROSTATIC BEARING WITH COMPENSATORY FLUID INJECTION

TECHNICAL FIELD

This invention relates to fluid film bearings and particularly to hydrostatic bearings with fluid supply passages uniquely arranged for improving bearing performance.

BACKGROUND OF THE INVENTION

Machine designers rely on rolling element bearings or fluid film bearings (hydrostatic bearings or hydrodynamic bearings) to support the shafts of rotary machines. The type of bearing selected for a given application depends in part on the shaft diameter and rotational speed and on the dynamic behavior of the shaft. Designers use "DN", the numerical product of shaft diameter expressed in millimeters and rotational speed expressed in revolutions per minute, as a rough guide for bearing selection. Hydrostatic bearings are often favored for machines in which the shaft dynamics are a concern. For example hydrostatic bearing are often favored when the DN parameter exceeds about 2.5 million and the fluid comprising the fluid film is a low viscosity fluid. Hydrostatic bearings are also often preferred for machines in which the DN parameter is below about 300,000 and the fluid is a high viscosity fluid.

A hydrostatic bearing includes a collar with a cylindrical, radially inner load bearing surface. An array of shallow pockets extends circumferentially along the bearing surface. The pocket array is axially bordered by forward and aft edge lands, and each pocket is circumferentially separated from its two neighboring pockets by interpocket lands. The pocket array is axially centered on the bearing surface so that the axial lengths of the two edge lands are approximately equal. A fluid injection passage opens into each pocket to connect the pockets to a supply of pressurized fluid. When the bearing is installed in the rotary machine, the bearing collar circumscribes the shaft to define a narrow film annulus whose radial dimension is typically about 0.1 percent of the shaft diameter.

In operation, the pressurized fluid is continually injected into the pockets by way of the injection passages. The pressurized fluid flows into and fills the film annulus to form a load supportive fluid film for supporting the shaft. The fluid then flows axially out of the annulus and into relatively low pressure vent regions axially adjacent to each edge land.

One shortcoming of a conventional hydrostatic bearing becomes apparent if the vent pressures are substantially unequal. Under these conditions, a greater quantity of fluid flows toward the low pressure vent region than toward the high pressure vent region, compromising the stiffness (load supporting qualities) of the fluid film on the high pressure side of the bearing. Common practice is to compensate for the unequal vent pressures by employing pockets and radial injection passages that are offset toward the high pressure vent region. However this practice is not entirely satisfactory since it fails to adequately address the problem of diminished film stiffness and can degrade the vibration damping qualities of the fluid film. Moreover, the offset configuration can increase the cross coupled stiffness of the bearing and shaft assembly, leading to self excited, unstable shaft motion.

A second shortcoming of a conventional hydrostatic bearing is evident even when the vent pressures are not substantially unequal. The rotation of the shaft imparts a substantial tangential velocity component to the fluid in the film annulus. The accompanying fluid dynamic drag elevates the cross coupled stiffness of the bearing and shaft assembly and therefore establishes a threshold rotational speed above which the shaft is susceptible to self excited, unstable rotary motion. One possible way to increase the stability of the rotor system is suggested in a 1967 paper entitled "Bearings with a Tangential Gas Supply" by Ales Tondl. Tondl advocates the use of obliquely oriented injection passages ("nozzles") so that the injected fluid enters the pockets with a tangential directional component. Tondl reports having tested a bearing configuration with eight pockets, each featuring two such injection passages. Tondl concludes, based on theoretical analysis supported by experimental evidence, that susceptibility to self excited instabilities is diminished if the fluid is introduced into the pockets with a tangential directional component opposite to the direction of shaft rotation. A hydrostatic bearing with stability enhancing, tangentially directed supply passages is also disclosed in U.K. Patent 1,149,425. A further improved hydrostatic bearing is disclosed in U.S. Pat. No. 5,433,528. That patent acknowledges the benefits of tangentially directed fluid injection opposite to shaft rotation. The patent illustrates a bearing with tangentially directed supply passages and a pair of diametrically opposed axial grooves that enhance bearing stability. However, despite the above described advances in improving the stability of hydrostatic bearings, engineers and designers continually seek ways to achieve stable rotor operation at higher rotational speeds.

SUMMARY OF THE INVENTION

It is, therefore, an object of the inventive bearing to operate under substantially unequal vent pressures without any appreciable loss of bearing stiffness, damping or stability. It is another object to expand the stable operating speed range of a hydrostatic bearing even when the vent pressures are not substantially unequal.

According to a first aspect of the invention, a hydrostatic bearing includes a number of pockets each of which receives pressurized fluid from at least one directionally selective fluid injection passage, each passage being configured to direct a stream of fluid axially toward a common vent region. In one detailed embodiment of the invention, the vent regions include a low pressure vent region and a high pressure vent region, and all the pockets receive pressurized fluid from injection passages whose discharge openings are axially aligned with the centerplane of the bearing collar. The passages are all oriented at a common angle relative to the centerplane so that the pressurized fluid stream has an axial directional component directed toward the high pressure vent region.

According to a second aspect of the invention, a hydrostatic bearing includes a number of pockets each of which receives pressurized fluid from at least two directionally selective fluid injection passages, the passages each being configured to direct a stream of fluid tangentially opposite to the direction of shaft rotation. The passage openings are axially offset from the centerline of the pockets and are distributed on both sides of the centerline. In one detailed embodiment, each pocket is supplied by exactly two directionally selective passages whose discharge openings are equidistantly and oppositely axially offset from the centerline. The passages are oriented so that the pressurized fluid streams issuing from the passage discharge openings have a slight axial directional component away from the centerline as well as a tangential directional component opposite to the direction of shaft rotation.

One advantage of the inventive bearing is its ability, when configured for axially directed fluid injection, to tolerate substantially unequal vent pressures without suffering a detrimental change in stiffness, damping or rotor system stability. Another advantage of the inventive bearing, when configured for multiple, axially offset tangential fluid injection opposite to the direction of shaft rotation, is an increase in the threshold of self excited unstable shaft motion.

The foregoing features and advantages and the operation of the invention will become more apparent in light of the following description of the best mode for carrying out the invention and the accompanying drawings.

BRIEF DESCRIPTION OF THE DRAWINGS

FIG. 2 is an enlarged view of the components visible in FIG. 1.

BEST MODE FOR CARRYING OUT THE INVENTION

Figure 1:
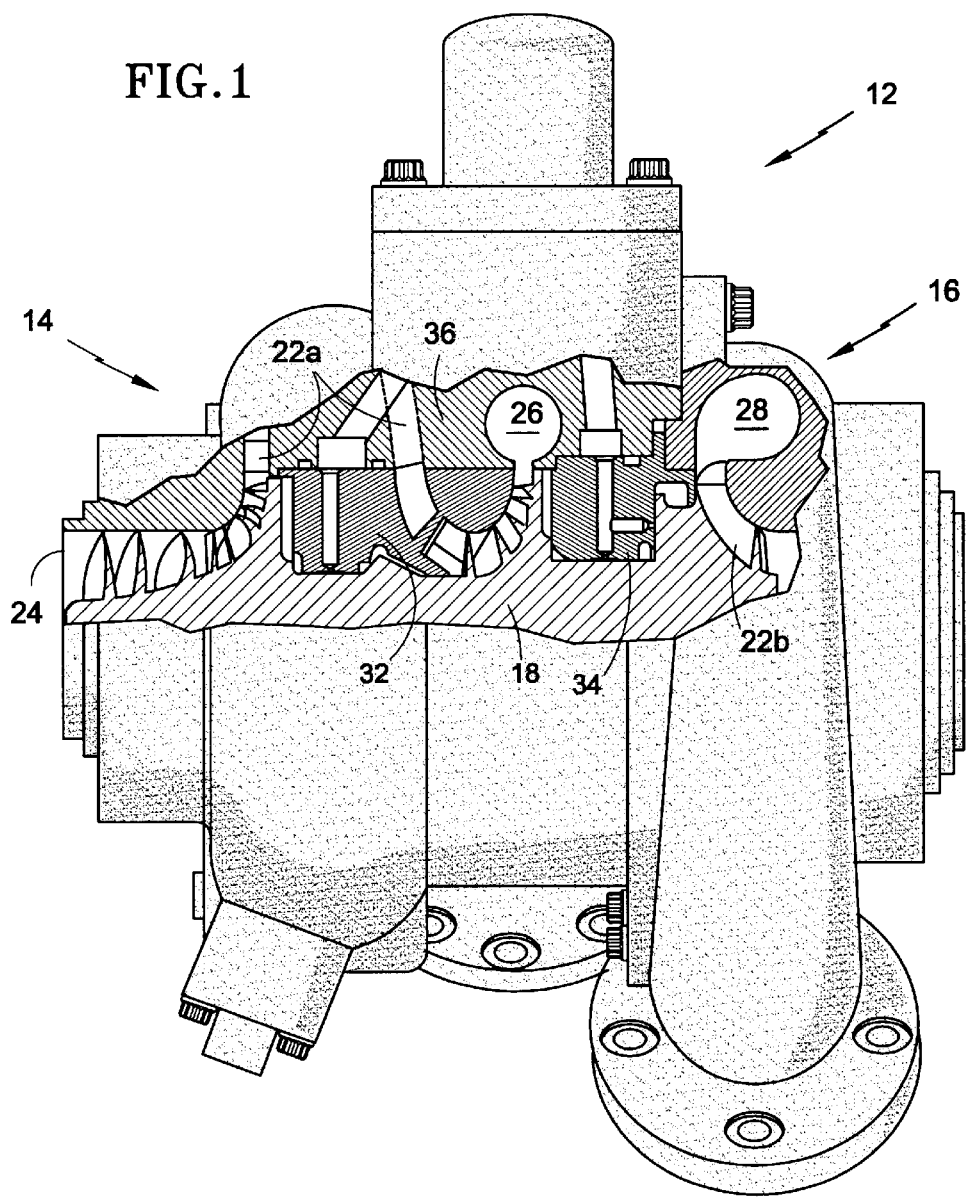
FIG. 1 is a side view of a rocket motor turbopump with the pump casing partially broken away to expose selected internal components including a hydrostatic bearing according to one aspect of the present invention for supporting the forward end of a rotatable shaft.

This invention is predicated in part on the recognition that the high speed stability of a hydrostatic bearing and shaft assembly is degraded by the viscous drag of the fluid film in the film annulus between the bearing and shaft, and that rotor system stability can be improved by minimizing the residence time of the fluid in the film annulus.

Referring to FIGS. 1–4, a rocket motor turbopump 12 includes a two stage impeller 14, a single stage turbine 16 and a shaft 18 connecting the turbine to the impeller. An impeller flowpath 22a having an intake 24 extends through the impeller stages to a collection plenum 26. A turbine flowpath 22b extends from a turbine supply plenum 28 through the turbine stage. A pair of hydrostatic journal bearings, which include an impeller bearing 32 and a turbine bearing 34, rotatably support the shaft on a turbopump frame 36.

In the above described rocket motor, which is an example of an expander cycle, the impeller pressurizes a working medium fluid such as liquid hydrogen. The pressurized liquid hydrogen discharges from the collection plenum 26 and flows over a rocket motor exhaust nozzle (not shown) to cool the nozzle. Heat transferred from the exhaust nozzle vaporizes the liquid hydrogen. The resultant gaseous hydrogen flows into the supply plenum 28 and then partially expands through the turbine to drive the turbine and power the impeller. The gaseous hydrogen then enters the rocket motor combustion chamber and fuels the combustion reaction inside the chamber.

Figure 3:
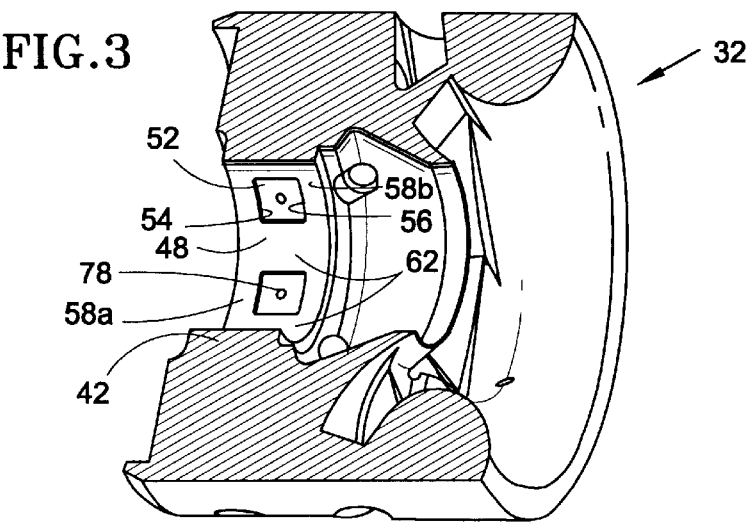
FIG. 3 is a perspective view of a 180° segment of the hydrostatic bearing of FIGS. 1 and 2.
Figure 4:
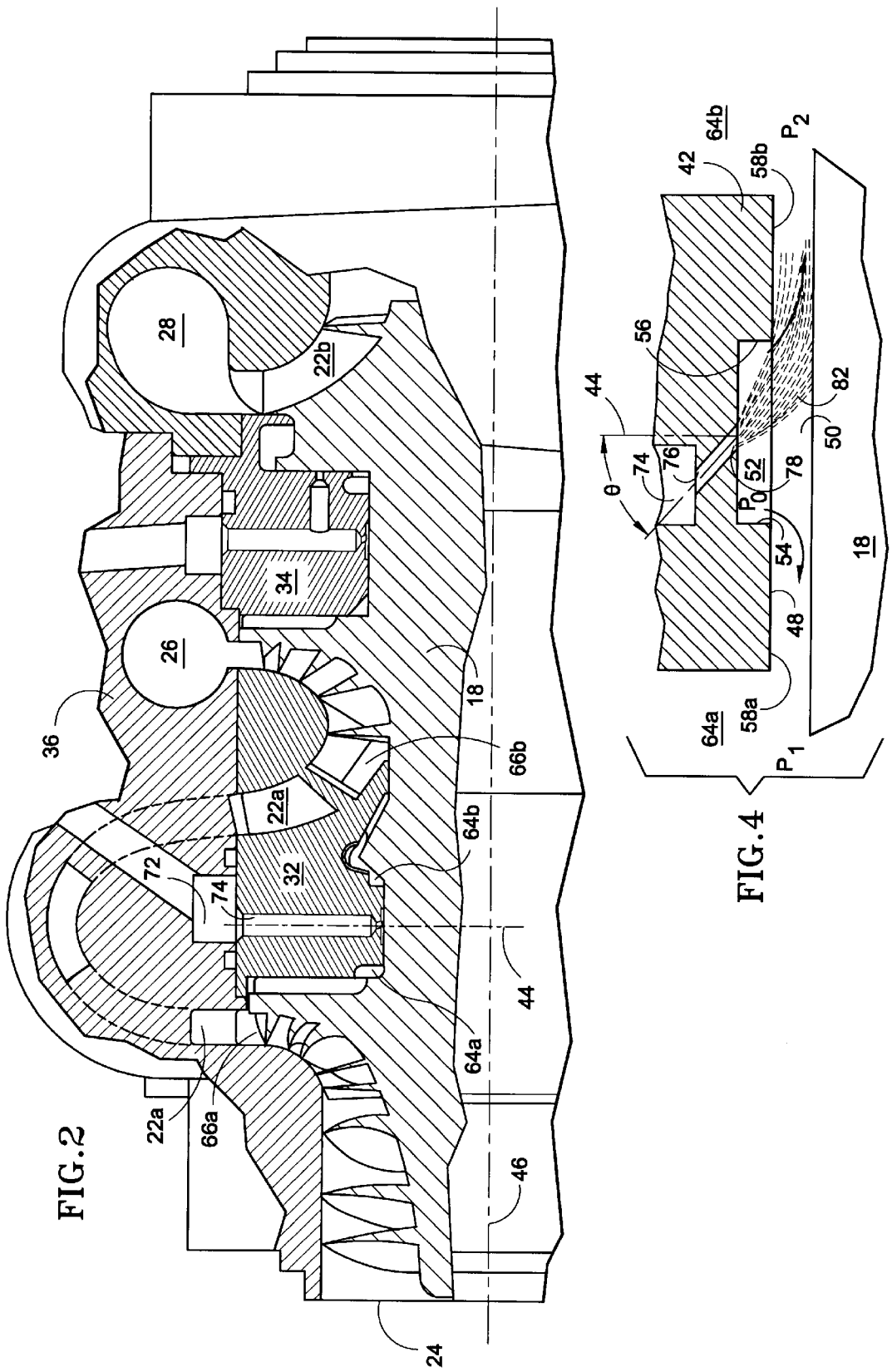
FIG. 4 is an enlarged schematic side view showing additional details of the hydrostatic bearing of FIGS. 1–3 according to one aspect of the present invention.
Figure 5:
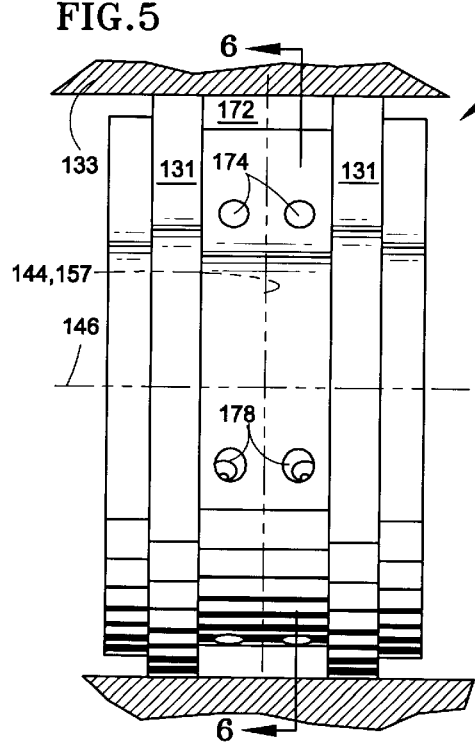
FIG. 5 is a schematic side view of a hydrostatic bearing according to a second aspect of the invention.

Referring primarily to FIGS. 2–4, the impeller bearing 32 includes a collar portion 42, whose centerplane 44 is perpendicular to the turbopump rotational axis 46. The collar has a cylindrical, radially inner bearing surface 48 that intimately circumscribes the shaft 18 to define a narrow film annulus 50 (shown highly exaggerated in FIG. 4). An array of discrete, shallow pockets 52, each having a forward edge 54 and an aft edge 56 are circumferentially distributed along the bearing surface. The pocket array is axially centralized on the bearing collar 42 so that the pockets are symmetric about the centerplane 44. The pocket array is axially bordered by edge lands 58a, 58b, and each pocket is circumferentially separated from its two neighboring pockets by an interpocket land 62. Each pocket communicates, by way of the film annulus 50, with vent regions 64a, 64b, which are adjacent to the bearing collar and axially spaced apart on opposite sides of the pocket array. Vent region 64a also communicates with the impeller flowpath at an interstage location 66a where the liquid hydrogen has been only partially pressurized. Vent region 64b also communicates with the impeller flowpath 22a, but at a location 66b where the liquid hydrogen has been more completely pressurized. Thus, the vent pressure $p_1$ in region 64a is relatively low, and the vent pressure $p_2$ in region 64b is relatively high.

The turbopump also includes a fluid injection system for introducing fluid into the film annulus. The injection system includes a supply annulus 72, supplied with pressurized fluid from an external source, and a set of feed lines 74 each of which extends from the annulus toward an associated pocket. A flow restricting fluid injection passage 76 immediately adjacent to each pocket connects each pocket to one of the feed lines 74. Each injection passage has a discharge opening 78 axially aligned with the centerplane 44 for injecting a stream of pressurized fluid 82 into the pocket. In the illustrated turbopump, the injected fluid is liquid hydrogen diverted from the impeller gaspath 22a. The fluid is radially confined in the film annulus to form a fluid film for rotatably supporting the turbopump shaft 18. Since the fluid pressure $p_0$ in the pockets exceeds the vent pressures $p_1$, $p_2$, the fluid flows axially into the vent regions and is continually replenished through the injection passages. If the vent pressures are unequal, the volume of injected fluid flowing toward the lower vent pressure will exceed that flowing toward the higher vent pressure. If the vent pressures are substantially unequal, bearing performance (e.g. fluid film stiffness, fluid film damping capability and rotor system dynamic stability) can be significantly compromised.

As seen most clearly in FIG. 4, the injection passages 76 are directionally selective. The pressurized fluid stream 82 issuing from the discharge opening 78 of each directionally selective passage has an axial directional component directed toward a common one of the two vent regions, specifically the high pressure vent region 64b. In the illustrated embodiment, the directional selectivity of the passages 76 is realized by orienting the passages at an angle θ relative to the centerplane 44. Directing the fluid toward the high pressure vent region 64b, counteracts the propensity of the fluid to become distributed preferentially toward the low pressure vent region. Moreover, since the pockets are not axially offset, as is the prior art compensatory practice, stiffness, damping and rotor system stability are not appreciably degraded.

In general, a directionally selective passage 76 is associated with each member of a selected subset of the pockets 52. For the bearing depicted in the illustrations, the subset includes all the pockets of the pocket array. Moreover, the directionally selective passages may impart a tangential directional component, as well as an axial directional component, to the fluid stream 82. However in the illustrated bearing, the axial directional component is unaccompanied by any appreciable tangential directional component. The orientation angle θ may differ from pocket to pocket to account for circumferentially dependent influences such as circumferentially nonuniform vent pressures. However in the illustrated bearing, the orientation angles are all equal.

The passage orientation angle θ is selected to effectively compensate for the unequal vent pressures $p_1$, $p_2$ without starving the low pressure edge land 58a. If the angle is too small, the passage orientation approaches the radial orientation characteristic of the prior art and the desired compensatory effect will not be achieved. If the angle is too large (i.e. if the passage orientation approaches being parallel to the turbopump axis 46 the axial directional component of fluid stream 82 could overcompensate for the unequal vent pressures and starve the low pressure edge land. The magnitude of the orientation angle depends on a number of factors including fluid viscosity, axial length of the bearing collar, nominal radial dimension of the film annulus, supply pressure and vent pressures. For example, the illustrations represent a bearing having an inner bearing surface diameter of about 1.2 inches, a collar axial length of about 0.6 inches with each edge land measuring about 0.181 inches. Six pockets, each about 0.238 inches in axial length, about 0.008 inches deep and subtending an arc of about 22.7° are equiangularly distributed around the bearing collar. The nominal radial dimension of the film annulus is about 0.002 inches and the shaft speed is about 175,000 rpm. The fluid is liquid hydrogen at a temperature of about −360° F. at a pressure $p_0$ of about 3280 pounds per square inch (psi). The vent pressures $p_1$, $p_2$ are about 940 psi and 2270 psi respectively. For the above described geometry and operating conditions, computational fluid dynamic analyses established an orientation angle θ of 41°.

A second hydrostatic bearing is illustrated in FIGS. 5–9. The bearing 132 includes a set of rails 131 and resides with a bearing frame 133. The bearing has a collar portion 142, whose centerplane 144 is perpendicular to the bearing axis 146. The collar has a cylindrical, radially inner bearing surface 148 that intimately circumscribes a shaft 118 (FIG. 7) to define a narrow film annulus 150. An array of discrete, shallow pockets 152, each having a forward edge 154 and an aft edge 156 are circumferentially distributed along the bearing surface. The pocket array is axially bisected by a centerline 157, which itself is axially aligned with the centerplane 144, so that the pockets are symmetric about the centerplane 144. The pocket array is axially bordered by edge lands 158a, 158b, and each pocket is circumferentially separated from its two neighboring pockets by an interpocket land 162. Each pocket communicates, by way of the film annulus 150, with vent regions 164a, 164b, which are adjacent to the bearing collar and axially spaced apart on opposite sides of the pocket array. The pressures $p_3$, $p_4$ in the vents regions are not necessarily substantially unequal.

The bearing 132 is served by a fluid injection system for introducing a pressurized, load supportive fluid into the film annulus. The injection system includes a supply annulus 172 defined by the bearing collar 142, rails 131 and frame 133. Two feed lines 174 extend from the annulus 170 toward each of the pockets. Each feed line has a flow restricting fluid injection passage 176 immediately adjacent to each pocket so that two injection passages open into each pocket by way of their respective discharge openings 178.

Figure 6:
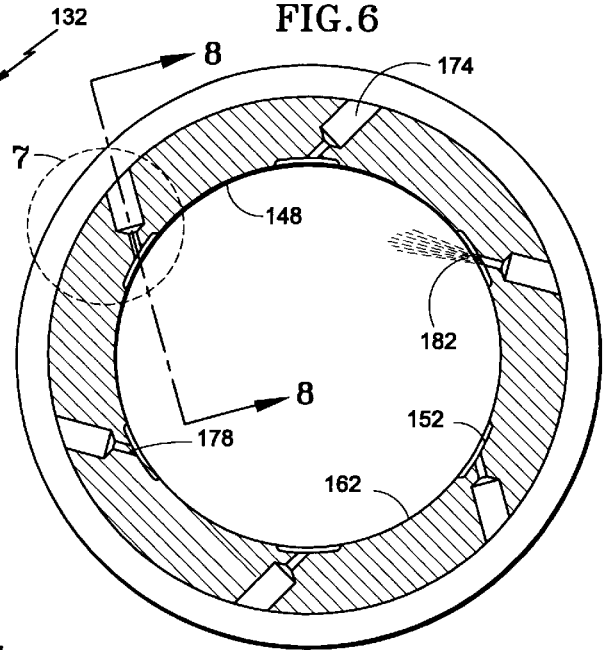
FIG. 6 is a view taken substantially in the direction 6—6 of FIG. 5 showing an array of bearing pockets with fluid injection passages opening into each pocket and oriented to inject fluid with a tangential directional component.
Figure 7:
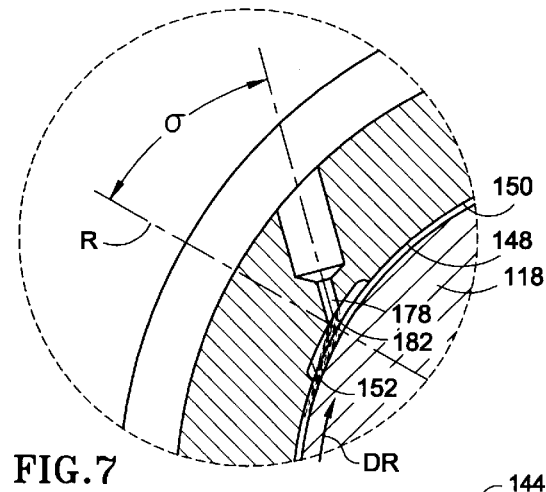
FIG. 7 is an enlarged view of a portion of FIG. 6 showing one of the passages and an associated pocket in greater detail.
Figure 9:
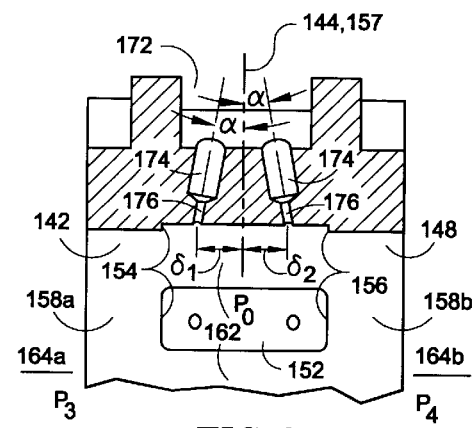
FIG. 9 is a view taken substantially in the direction 8—8 of FIG. 6 showing an embodiment of the invention in which the passages are oriented to inject fluid with an axial directional component in addition to the tangential directional component.
Figure 8:
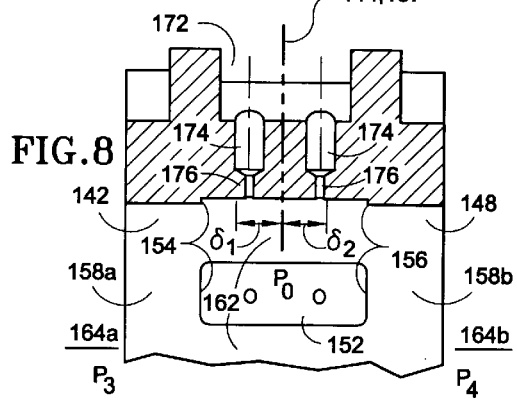
FIG. 8 is a view taken substantially in the direction 8—8 of FIG. 6 showing an embodiment of the invention in which the passages are oriented to inject fluid with a tangential directional component unaccompanied by any appreciable axial directional component.

As seen most clearly in FIGS. 6 and 7, the injection passages 176 are directionally selective. The pressurized fluid stream 182 issuing from the discharge opening 178 of each directionally selective passage has a tangential directional component directed opposite to a prescribed direction $D_R$ of shaft rotation. In the illustrated embodiment, the directional selectivity of the passages 176 is realized by orienting the passages at a common angle σ relative to a radial reference R. In addition, and as seen in FIGS. 8 and 9, the passage openings are each offset from the centerline 157 by offset distances $\delta_1$ and $\delta_2$, with the openings distributed on opposite sides of the centerline. Positioning the passages away from the centerline and closer to vent regions 164a, 164b of the bearing collar minimizes the residence time of the injected fluid as it flows from the passages, across the edge lands and into the vent regions. By minimizing the residence time, the destabilizing influence of fluid drag is minimized, expanding the rotor system's stable operating range.

FIG. 8 illustrates a bearing in which the tangential directional component of fluid injection is unaccompanied by any appreciable axial directional component of fluid injection. FIG. 9 illustrates a bearing in which the tangential directional component of fluid injection is accompanied by an axial directional component of fluid injection directed away from the centerline 157. The axial directional component is realized by orienting each passage at a second angle α relative to the centerline. The axial directional component is small relative to the tangential directional component. For example the angle θ may be about 45° whereas each angle α is only about 10°. The axial directional component augments the axial offset of the passage openings by further minimizing the residence time of the fluid in the film annulus 150.

In general, multiple directionally selective, axially offset passages 176 are associated with each member of a selected subset of the pockets 152, and the passage discharge openings are distributed equally in number on opposite sides of the centerline. In the bearing represented by the illustrations the subset includes all the pockets of the pocket array, and exactly two passages 176 are associated with each member of the subset. The orientation angles σ and α and the axial offset distances $\delta_1$, $\delta_2$ may differ from pocket to pocket to account for any circumferentially dependent influences. However in the illustrated bearing, the orientation angles and offset distances are all equal. Moreover, the offset distances for the passage openings in any individual pocket may be unequal.

The orientation angles σ and α and the offset distances $\delta_1$, $\delta_2$ are selected to improve the stable operating speed range of the bearing by guarding against excessive fluid residence time in the film annulus 150. The magnitudes of the orientation angles and offset distances depends on a number of factors including fluid viscosity, axial length of the bearing collar, nominal radial dimension of the film annulus, supply pressure and vent pressures. The bearing represented by FIGS. 5–9 is an experimental bearing designed to operate with HFC-134a refrigerant as its load supportive fluid. HFC-134a shares most of the important properties of liquid hydrogen ($LH_2$) but is safer and easier to handle and therefore is suitable for simulating $LH_2$. A rocket motor turbopump bearing for use with $LH_2$ would reflect the same design principles as the bearing designed for use with HFC-134a, but may be dimensioned differently. The bearing represented by the illustrations has an inner bearing surface diameter of about 3.0 inches, a collar axial length of about 1.5 inches with each edge land measuring about 0.375 inches. Six pockets, each about 0.75 inches in axial length, about 0.010 inches deep and subtending an arc of about 29.3° are equiangularly distributed around the bearing collar. The nominal radial dimension of the film annulus is about 0.0027 inches and the design shaft speed is 40,000 rpm. The HFC-134a fluid is at a temperature of about 72° F. and a pressure $p_0$ of about 1500 psi. The vent pressures $p_3$, $p_4$ are both about 200 psi. For the above described geometry and operating conditions, computational fluid dynamic analyses were used to establish an orientation angle $\sigma$ of 45°, an orientation angle $\alpha$ of 10° and offset distances $\delta_1$, $\delta_2$ of 0.175 inches.

Although this invention has been shown and described with reference to a detailed embodiment, it will be understood by those skilled in the art that various changes in form and detail may be made without departing from the invention as set forth in the accompanying claims.

We claim:

1. A hydrostatic bearing for supporting a shaft, comprising:
   a bearing collar having a centerplane and a radially inner bearing surface that circumscribes the shaft to define a film annulus;
   an array of discrete pockets distributed circumferentially along the bearing surface, each pocket communicating with first and second vent regions by way of the film annulus, the vent regions being axially spaced from each other on axially opposite sides of the pocket array; and
   at least one directionally selective fluid injection passage associated with each member of a selected subset of the pockets, each directionally selective injection passage having a discharge opening for injecting a stream of pressurized fluid into the associated pocket so that the stream of fluid issuing from each directionally selective passage has an axial directional component directed toward a common one of the vent regions.

2. The bearing of claim 1 wherein the axial directional component is unaccompanied by any appreciable tangential directional component of fluid injection.

3. The bearing of claim 1 wherein the associated pockets include all the pockets of the pocket array.

4. The bearing of claim 1 wherein one of the vent regions is a low pressure vent region, the other of the vent regions is a high pressure vent region, and the common vent region is the high pressure vent region.

5. The bearing of claim 1 wherein the associated pockets are symmetric about the centerplane, and the discharge openings are substantially axially aligned with the centerplane.

6. The bearing of claim 1 wherein each directionally selective passage is oriented at an angle relative to the centerplane so that the fluid streams issuing from the directionally selective passages are axially directed toward a common one of the vent regions.

7. The bearing of claim 6 wherein the orientation angles are substantially equal.

8. The bearing of claim 7 wherein the angles are approximately 41 degrees.

9. A hydrostatic bearing for supporting a shaft, comprising:
   a bearing collar having a centerplane and a radially inner bearing surface that circumscribes the shaft to define a film annulus;
   an array of discrete pockets symmetric about the centerplane and distributed circumferentially along the bearing surface, each pocket communicating with a low pressure vent region and a high pressure vent region by way of the film annulus, the vent regions being axially spaced from each other on axially opposite sides of the pocket array; and
   a directionally selective injection passage associated with each pocket, each directionally selective injection passage having a discharge opening substantially axially aligned with the centerplane, each passage being oriented at an approximately common angle relative to the centerplane for injecting a stream of pressurized fluid into the associated pocket with an axial directional component directed toward the high pressure vent region.

10. A method of supporting a rotatable shaft, comprising:
    providing a bearing having a bearing surface that circumscribes the shaft to define a fluid film annulus that extends axially between a first vent region and a second vent region for radially confining a load supportive fluid film; and
    injecting a plurality of pressurized, circumferentially distributed fluid streams into the film annulus so that each stream enters the film annulus approximately axially midway between the vent regions and has an axial directional component directed toward a common one of the vent regions.

11. The method of claim 10 wherein the axial directional component is unaccompanied by any appreciable tangential directional component.

12. The method of claim 10 wherein the first vent region is a low pressure vent region, the second vent region is a high pressure vent region, and the common vent region is the high pressure vent region.

13. A fluid film bearing for supporting a shaft rotatable in a prescribed direction of rotation, comprising:
    a bearing collar having a centerplane and a radially inner bearing surface that circumscribes the shaft to define a film annulus;
    an array of discrete pockets distributed circumferentially along the bearing surface, each pocket extending axially from a forward edge to an aft edge, the pocket array being axially bisected by a centerline; and
    at least two directionally selective fluid injection passages associated with each member of a selected subset of the pockets, each directionally selective injection passage having a discharge opening for injecting a stream of pressurized fluid into the associated pocket with a tangential directional component opposite to the prescribed direction of shaft rotation, the openings being axially offset from the centerline and distributed on both sides thereof.

14. The bearing of claim 13 wherein the tangential directional component is unaccompanied by any appreciable axial directional component of fluid injection.

15. The bearing of claim 13 wherein the selected subset includes all the pockets of the pocket array.

16. The bearing of claim 13 wherein the centerline is axially aligned with the centerplane.

17. The bearing of claim 13 wherein the openings are distributed symmetrically about the centerline.

18. The bearing of claim 13 wherein exactly two directionally selective passages are associated with each member of the selected subset.

19. The bearing of claim 13 wherein each directionally selective passage is oriented at an angle such that the fluid streams issuing from the directionally selective passages have a tangential directional component opposite to the prescribed direction of shaft rotation.

20. The bearing of claim 19 wherein the orientation angles of the directionally selective passages are substantially equal.

21. The bearing of claim 20 wherein the angles are approximately 45 degrees.

22. The bearing of claim 19 wherein each directionally selective passage is also oriented at second angle relative to the centerline so that the fluid streams have an axial directional component directed away from the centerline.

23. The bearing of claim 13 wherein the tangential directional component of fluid injection is accompanied by an axial directional component of fluid injection so that the fluid streams issuing from the passages are directed away from the centerline.

24. A hydrostatic bearing for supporting a shaft rotatable in a prescribed direction of rotation, comprising:
 a bearing collar having a centerplane and a radially inner bearing surface that circumscribes the shaft to define a film annulus for radially confining a load supportive fluid film;
 an array of discrete pockets distributed circumferentially along the bearing surface, each pocket extending axially from a forward edge to an aft edge, the pocket array being axially bisected by a centerline; and
 exactly two directionally selective injection passages associated with each pocket, each directionally selective injection passage having a discharge opening equidistantly and oppositely axially offset from the centerline, each passage being oriented at an angle for injecting a stream of pressurized fluid into the associated pocket with a tangential directional component opposite to the prescribed direction of shaft rotation, each passage also being oriented at a second angle relative to the centerline so that the fluid streams issuing from the passages have an axial directional component directed axially away from the centerline.

25. A method of supporting a shaft rotatable in a prescribed direction of rotation, comprising:
 providing a bearing having a bearing surface that circumscribes the shaft to define a fluid film annulus that extends axially between a first vent region and a second vent region for radially confining a load supportive fluid film, the annulus having a centerplane approximately midway between the vent regions; and
 injecting two or more streams of pressurized fluid into the annulus at each of a plurality of circumferentially distributed injection sites so that the fluid streams at each injection site have a tangential directional component opposite to the prescribed direction of shaft rotation and are axially offset relative to each other so that some of the fluid streams enter the annulus axially closer to the first vent region than to the second vent region and other of the fluid streams enter the annulus axially closer to the second vent region than to the first vent region.

26. The method of claim 25 wherein the tangential directional component of each fluid stream is accompanied by an axial directional component directed toward the closer of the two vent regions.

27. The method of claim 25 wherein the fluid streams at each injection site are axially offset so that the quantity of fluid streams entering the annulus closer to the first vent region equals the number of fluid streams entering the annulus closer to the second vent region.

* * * * *